(12) United States Patent
Jacobsen

(10) Patent No.: US 7,951,212 B2
(45) Date of Patent: May 31, 2011

(54) METHOD AND APPARATUS FOR PRODUCING SYNTHESIS GAS FROM BIOMASS

(76) Inventor: Anker J. Jacobsen, Glostrup (DK)

(*) Notice: Subject to any disclaimer, the term of this patent is extended or adjusted under 35 U.S.C. 154(b) by 990 days.

(21) Appl. No.: 10/572,487

(22) PCT Filed: Sep. 16, 2004

(86) PCT No.: PCT/DK2004/000616
§ 371 (c)(1),
(2), (4) Date: Apr. 13, 2007

(87) PCT Pub. No.: WO2005/026296
PCT Pub. Date: Mar. 24, 2005

(65) Prior Publication Data
US 2007/0261948 A1 Nov. 15, 2007

(30) Foreign Application Priority Data

Sep. 16, 2003 (DK) .................................. 2003 01336

(51) Int. Cl.
*C10B 47/18* (2006.01)
(52) U.S. Cl. ............................ 48/197 R; 201/15; 202/85
(58) Field of Classification Search ..... 48/197 R–197 A, 48/127.1
See application file for complete search history.

(56) References Cited

U.S. PATENT DOCUMENTS

| | | | |
|---|---|---|---|
| 1,794,232 A | 2/1931 | Alfred | |
| 2,694,047 A | 11/1954 | Glazier | |
| 2,782,109 A | 2/1957 | Irving | |
| 2,879,139 A | 3/1959 | Thomsen | |
| 3,677,727 A | 7/1972 | Godel | |
| 3,966,634 A * | 6/1976 | Sacks | 252/373 |
| 4,432,290 A * | 2/1984 | Ishii et al. | 110/346 |
| 4,470,255 A | 9/1984 | Rowlands et al. | |
| 5,865,023 A | 2/1999 | Sorensen et al. | |

(Continued)

FOREIGN PATENT DOCUMENTS

DE 102 28 100 A 1/2003

(Continued)

OTHER PUBLICATIONS

PCT/IPEA/409 (International Preliminary Report on Patentability), Feb. 2, 2006, Jacobsen, Anker, Jarl.

(Continued)

*Primary Examiner* — Alexa D Neckel
*Assistant Examiner* — Imran Akram
(74) *Attorney, Agent, or Firm* — Edwards Angell Palmer & Dodge LLP; Peter C. Lauro, Esq.; Brian R. Landry, Esq.

(57) ABSTRACT

Method and apparatus for producing synthesis gas comprising the steps of combusting (4) a combustible gas to form hot flue gasses (7), passing the flue gasses (7) through heat storing means (1) so as to heat the heat storing means (1) to an elevated temperature, using the heat thus stored to heat biomass (2) to an elevated temperature so as to form synthesis gas, and withdrawing at least part of the synthesis gas formed, wherein following heating of the heat storing means (1) gaseous medium is circulated through the heat storing means (1), the biomass (2) and back to the heat storing means (1). Furthermore computer program product for performing the method of the invention and the use of the produced biogas are disclosed.

20 Claims, 3 Drawing Sheets

U.S. PATENT DOCUMENTS

| | | | |
|---|---|---|---|
| 5,935,387 A | 8/1999 | Tratz et al. | |
| 6,133,328 A | 10/2000 | Lightner | |
| 2004/0055865 A1* | 3/2004 | Beierle | 201/25 |

FOREIGN PATENT DOCUMENTS

| | | |
|---|---|---|
| EP | 0 971 017 | 1/2000 |
| FI | 1611 | 11/1901 |
| GB | 207651 | 12/1923 |
| GB | 216021 | 5/1924 |
| GB | 239280 | 9/1925 |
| GB | 272026 | 6/1927 |
| GB | 633 718 A | 12/1949 |
| SE | 462 753 | 8/1990 |
| WO | WO 99/42540 A | 8/1999 |

OTHER PUBLICATIONS

Danish Examination Report.

* cited by examiner

METHOD AND APPARATUS FOR PRODUCING SYNTHESIS GAS FROM BIOMASS

This application is a U.S. national phase application, pursuant to 35 U.S.C. §371, of PCT international application Ser. No. PCT/DK2004/000616 filed Sep. 16, 2004, designating the United States and published in English on Mar. 24, 2005 as publication WO20005/026296 A1, which claims priority under 35 U.S.C. §119 to Denmark patent application Ser No. PA 2003 01336 filed Sep. 16, 2003. The entire contents of the aforementioned patent applications are incorporated herein by this reference.

BACKGROUND OF THE INVENTION

This invention relates to an apparatus and method of producing synthesis gas from biomass. The invention furthermore relates to computer processing product for performing the method of the invention and the use of the produced synthesis gas.

It is well known to produce synthesis gas which is a mixture primarily consisting of CO and $H_2$ from fossil materials such as coal and crude oils, see U.S. Pat. No. 5,637,259.

However, since such raw materials are available only in limited amounts scientists have lately focussed on the production of synthesis gas from renewable raw materials such as raw materials derived from plants e.g. biomass.

Examples of such biomasses are wood, straw, waste paper, municipal solid waste and mixtures thereof.

It is well known that by heating wood materials to a high temperature such as 800° C. under anaerobic conditions the wood materials give off gaseous and liquid substances leaving behind charcoal. When the charcoal is reacted with carbon dioxide and water at high temperatures synthesis gas is formed. Synthesis gas can also be produced by cracking tar materials.

The composition of the produced synthesis gas can be controlled e.g. by separation of carbon dioxide see e.g. U.S. Pat. No. 6,133,328.

U.S. Pat. No. 6,133,328 describes a three step method of producing synthesis gas from biomass. In the first step the biomass is dried to form moisture free biomass.

In the second step the biomass is burned under anaerobic conditions to form charcoal and the flue gasses thus produced are passed through heat storage means to heat said means to an elevated temperature. In the third step water is passed through the hot heat storage means and evaporated to form hot steam which is passed through the charcoal formed in the preceding step so as to form synthesis gas.

EP 971017A2 discloses a method and a device for converting solid fuel into a lean gas having low calorific value for direct use in an internal combustion engine. The fuel is heated to a temperature effecting pyrolysis and subjecting a further treatment at a temperature ensuring that long-chain and/or poly(cyclic) hydrocarbon compounds are cracked thermally.

It is an object of this invention to provide a simple, environmental friendly method and apparatus for producing synthesis gas from biomass.

It is a further object of this invention to provide a method and apparatus for producing synthesis gas, which are less energy consuming than prior art processes.

Another object of this invention is to manufacture synthesis gas for use in the synthesis of chemicals e.g. methanol.

Yet another object of this invention is to manufacture synthesis gas for use as fuel, e.g. for internal combustion engines or fuel cells.

Still another object of this invention is to provide a method for the production of synthesis gas containing only an insignificant amount of contaminants.

SUMMARY OF THE INVENTION

The method of the invention comprises the steps of combusting a combustible gas to form hot flue gasses, passing said flue gasses through heat storing means so as to heat said heat storing means to an elevated temperature, using the heat thus stored to heat biomass to an elevated temperature so as to form synthesis gas and withdrawing at least part of the synthesis gas formed is characterised in that following heating of the heat storing means gaseous medium is circulated through the heat storing means, the biomass and back to the heat storing means.

The invention is based on the discovery that it is possible to produce synthesis gas from biomass without subjecting the biomass to an initial drying operation by passing the gaseous medium several times, e.g. four to six times, through the heat storing means and the biomass. The circulation is continued until the temperature within the heat storing means has dropped to a level at which the production of synthesis gas is substantially reduced.

At this stage the first step may be repeated so as to reheat the heat storing means to an elevated temperature, whereafter the circulation is resumed. Furthermore, the circulation can also be reversed if required.

As the gaseous medium passes through and is in direct contact with the biomass, the biomass is directly heated and thus no thermal energy is lost in the heating process. This is especially advantageous compared to known methods of producing synthesis gas and relying on heat exchange across a wall of a vessel comprising the biomass.

Except for the start of the combustion step where it may be necessary to use an external source of combustion gas, the combustible gas used to form hot flue gasses is preferably a portion of the synthesis gas formed by the heating of the biomass. The oxygen used for the combustion of the combustible gas is preferably supplied in the form of air and more preferably preheated air.

By properly adjusting the combustion of the combustible gas the flue gasses may obtain a temperature of 800-1600° C. and preferably 1200-1400° C. and by passing the flue gasses through the heat storing means the latter may be heated to a similar high temperature. The heat storing means preferably comprises a porous bed of an inorganic temperature resistant material such as pieces of calcium oxide. These pieces preferably have a size of from 20 to 50 mm.

The synthesis gas produced may contain contaminants such as tar and other high molecular weight substances. However, when passing through the hot heat storing means these contaminants tend to be thermally cracked. By using heat storing materials having a catalytic effect the high molecular weight substances may additionally be catalytically cracked in a manner known per se, thus forming synthesis gas which is substantially free from contaminants.

Catalytic cracking of high molecular weight substances such as tar is especially advantageous compared to thermal cracking because it is more effective and can occur at lower temperatures.

The biomass is preferably placed in an elongated vertically arranged reactor and the hot gaseous medium is preferably introduced at the lower end of the reactor and withdrawn from the top end.

The invention also relates to an apparatus for producing synthesis gas, said apparatus comprising combustion means for producing hot flue gasses from a combustible gas, heat storing means, means for passing hot flue gasses through said heat storing means, a biomass reactor and means for circulating gaseous medium through said heat storing means, the biomass reactor and back to the heat storing means, or in the reversed order.

The combustion means preferably encompasses a burner with means for supplying combustible gas and air to said burner.

In a preferred embodiment of the invention the means for supplying combustible gas to the combustion means are connected with the means for circulating gaseous medium through the heat storage means and the biomass reactor so as to allow synthesis gas formed in the biomass reactor to be used as combustible gas in the combustion means.

A particularly preferred embodiment of the apparatus of the invention comprises two biomass reactors interconnected at their lower ends through two combustion means and intervening common heat storing means and also interconnected at their upper ends through means for transporting gaseous medium between the two biomass reactors.

This embodiment is particularly advantageous because it allows the gaseous medium passing through the second biomass reactor to be preheated during the production of gas in the first reactor. The produced gas can e.g. be synthesis gas or other gaseous materials producible in the apparatus of the invention.

Thus, during the step in which gaseous medium is circulated through the heat storing means and the first biomass reactor, the gaseous medium is also passed through the second biomass reactor before it returns to the heat storing means and thus causes said gaseous medium to be preheated.

When the heat treatment of a part of the biomass in the first biomass reactor is terminated the heat treated biomass is removed therefrom and a new biomass is introduced therein. In the following period the heat storing means is heated by passing hot flue gasses therethrough in a direction which is opposite to the flow direction during the preceding step and following the reheating of the heat storing means gaseous medium is circulated through the heat storing means, the second biomass reactor, the first biomass reactor and back to the heat storing means, thus causing the gaseous medium to be preheated when passing through the first biomass reactor. Furthermore, a part of tar materials in the gaseous medium are thermally cracked when preheating the gaseous medium during transport through the first biomass reactor.

By conducting the method of the invention in such an alternating manner substantial energy savings are obtained. The energy may be further saved by supplementing the dual biomass reactor apparatus with additional heat storing means for storing heat contained in the flue gasses leaving the common heat storing means. These additional heat storing means are used for preheating the air to be supplied to the combustion means during the following step where the central heat storing means are heated by means of flue gas passing through said means in the opposite direction.

Furthermore, by alternating the direction of the flow, the build-up of by-products and unwanted chemicals in the reaction can be efficiently minimised. Tar that can form in the biomass reactor is in a gaseous form in the bottom the biomass reactor, where the temperature is highest, but becomes liquefied as the temperature decreases higher up in the biomass reactor. The tar condenses and can clog the system at worst. By alternating the gasification cycle the tar is moved from the top part of the biomass reactor, where it is liquefied, down to the bottom of the biomass reactor and thereafter to the heat storage means. This enhances the thermal and catalytic cracking of the tar in a manner known per se.

Another advantage of using alternating gas circulation is that in the "colder" end/part of the heat storage means there is a possibility of build-up of soot. By alternating the cycles this build-up can be burnt away or efficiently removed. Furthermore, the alternating gas circulation prevents clogging of the system.

The means for transporting gaseous means between the upper ends of the two biomass reactors preferably comprise conduits including a valve system which allows the gaseous medium to be transported in both directions by means of a one-way pump.

A further preferred embodiment of the invention comprises two vertically mounted biomass reactors each reactor communicating at its lower end with a combustion chamber having means for introducing a mixture of combustible gas and a oxygen containing medium, such as air, therein, one part of each combustion chamber communicating with auxiliary heat storing means and another part of each combustion chamber communicating with the common heat storing means.

In operation the two biomass reactors are filled with biomass and a mixture of combustible gas and air is introduced into the (first) combustion chamber communicating directly with the first biomass reactor so as to form hot flue gasses. The flue gasses are passed through the common heat storing means, the (second) combustion chamber and through the auxiliary heat storing means communicating with the second combustion chamber. In the next step gaseous medium is circulated through the common heat storing means, the first biomass reactor and back to the second combustion chamber through the second biomass reactor in which the gaseous medium gives off heat before it is re-introduced into the common heat storing means.

In the next step the mixture of combustible gas and air is burned in the second combustion chamber to form hot flue gasses which are passed through the common heat storing means and further on through the auxiliary heat storing means communicating with the first combustion chamber to heat said auxiliary heat storing means.

The final step of the alternatingly operated apparatus comprises circulating gaseous medium through the common heat storing means, the second biomass reactor and via the first biomass reactor back to the common heat storing means.

Apart from being energy saving the apparatus described above forms an uncomplicated and compact unit.

The invention also relates to the use of the synthesis gas produced according to the method of the invention for the synthesis of chemicals, e.g. methanol, and fuel for internal combustion engines and fuel cells.

Furthermore, the invention relates to a computer program product comprising program code means adapted to cause, when executed on a processing unit for controlling an apparatus for performing the method of claim 1, to cause the processing unit to control at least said step of circulating gaseous medium through the heat storing means, the biomass and back to the heat storing means. Preferably, the program code means is further adapted to cause the processing unit to monitor the temperature or the amount of produced synthesis gas, and in response thereto controlling the direction of the flow of gaseous medium The invention also relates to a processing unit configured to perform the method of producing synthesis gas, comprising controlling an apparatus to cause the processing unit to control at least said step of circulating gaseous medium through the heat storing means, the biomass and back to the heat storing means.

It is noted that the features of the apparatus and method described above and in the following may be implemented in software and carried out on a data processing unit or other processing means caused by the execution of program code means such as computer-executable instructions. Here and in the following, the term processing unit comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

For example, the program code means may be loaded in a memory, such as a RAM, from a storage medium or from another computer via a computer network. Alternatively, the described features may be implemented by hardwired circuitry instead of software or in combination with software.

BRIEF DESCRIPTION OF THE DRAWINGS

The invention will now be described in further detail with reference to the drawings which.

DETAILED DESCRIPTION

Figure 1:
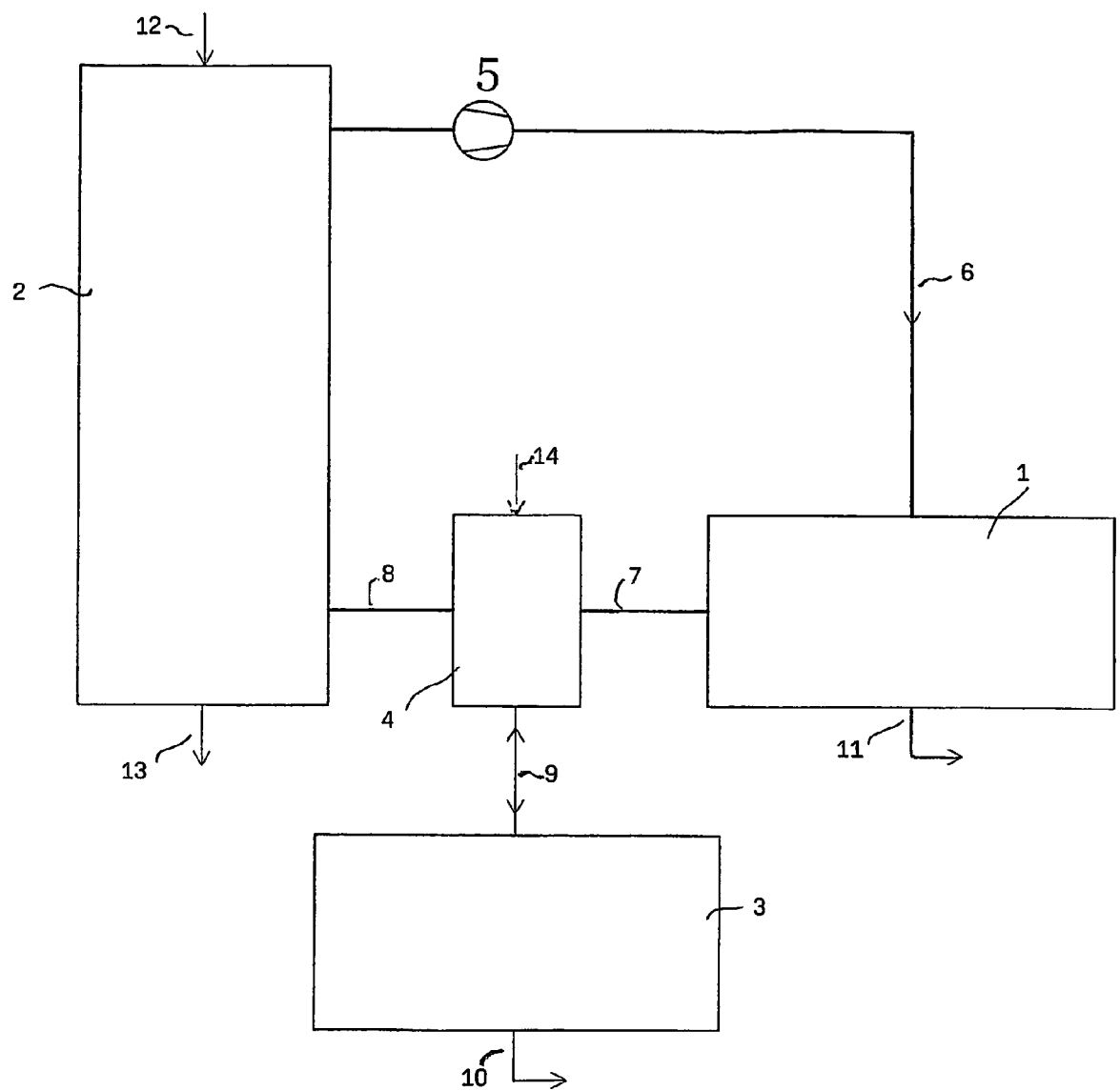
FIG. 1 shows a flow chart of preferred embodiment of the apparatus according to the invention.

FIG. 1 illustrates a heat storing means 1 connected by conduit e.g. pipe or other gas transporting means 7 to a combustion chamber 4, which is connected by a conduit 8 to a biomass reactor 2. The biomass reactor 2 is connected to the heat storing means 1 via a pump 5 through a conduit 6. The combustion chamber is connected through a conduit 9 to a gas storing means 3, the gas storing means 3 having an outlet 10. The combustion chamber furthermore has a supply conduit 14.

The heat storing means 1 also comprises an outlet or e.g. a valve 11 for releasing flue gasses passing through the heat storing means 1 during heating.

The heat storing means 1 comprise a bed of heat resistant material, such as stone pellets, porcelain and other ceramic materials. The heat storing means may also comprise CaO, dolomite and other metal oxides, comprising aluminium and magnesium oxides as well as zeolites.

The biomass reactor 2 furthermore comprises an inlet for receiving biomass 12 and an outlet for removing by-products like e.g. ash 13. It is possible to place a mesh or other sieving means in the bottom of the biomass reactor 2 separating the biomass from the ash. The ash can then be removed from the biomass reactor 2 through the outlet 13.

The apparatus operates in the following way:

Biomass is introduced in the biomass reactor 2 through the inlet 12 and during the operation biomass is continuously added to the biomass reactor 2. Combustible gas from the gas storing means 3 is transported to the combustion chamber 4 by a conduit 9. During upstart combustible gas is supplied to the combustion chamber 4 from an external gas source. Air is supplied to the combustion chamber 4 through the inlet 14 as an oxygen source for the combustion. The produced flue gas is passed through the conduit 7 to the heat storing means 1, where it heats the heat storing means 1 and is removed from the heat storing means 1 through the outlet 11. After heating the heat storing means 1 the transport of combustible gas from the gas storing means 3 to the combustion chamber 4 is stopped. The gaseous medium already present in the apparatus is passed through the heat storing means 1, where it is heated, through the combustion chamber 4 via conduits 7 and 8 to the biomass reactor 2 where synthesis gas is produced. The produced synthesis gas is recycled through conduit 6 to the heat storing means 1 via a pump 5. Part of the produced synthesis gas is withdrawn from the combustion chamber 4 though the conduit 9 for storage in the gas storing means 3 while another part of the synthesis gas is circulated through the biomass reactor 2 and the heat storing means 1 again. Synthesis gas can be removed from the gas storage 3 through outlet 10

The transport of gaseous medium through the apparatus is controlled by the pump 5, e.g. and preferably a one-way pump. The pump 5 can be located in the system where it is most convenient, preferably the pump 5 is placed between the biomass reactor 2 and the heat storage means 1 as that is where the temperature is lowest.

Figure 2:
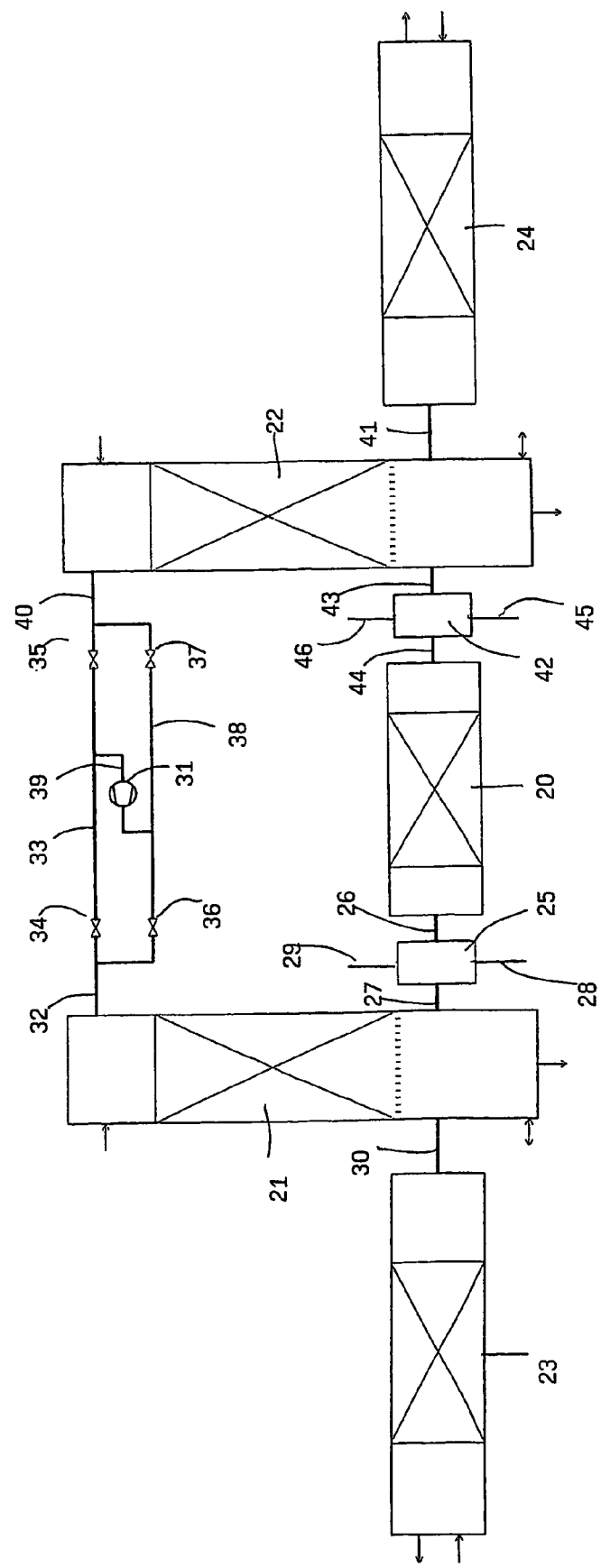
FIG. 2 shows a flow chart of another preferred embodiment of the apparatus according to the invention.

FIG. 2 illustrates a heat storing means 20 connected to a first combustion chamber 25 through a conduit 26 and a first combustion chamber 25 is connected by conduit 27 to a first biomass reactor 21. The first combustion chamber 25 has a conduit 28 leading to a gas storage means and an inlet 29 for transporting air to the combustion chamber. The first biomass reactor 21 is furthermore connected to a first auxiliary heat storing means 23 through a conduit 30. The upper part of the biomass reactor 21 is connected to a main gas line 33 with a conduit 32. The main gas line 33 has two valves 34, 35 and a secondary gas line 38 has two valves 36 and 37. The secondary gas line 38 is connected to at one end the main gas line 33 between the valve 34 and the first biomass reactor 21 and at the other end between valve 35 and a second biomass reactor 22, thereby forming a loop. One-way pump 31 is placed in a conduit 39 connecting the main gas line 33 and the secondary gas line 38. The main gas line 33 is connected through a conduit 40 to the second biomass reactor 22. The second biomass reactor 22 is connected to a second auxiliary heat storing means 24 through a conduit 41 as well as being connected to a second combustion chamber 42 through a conduit 43. The second combustion chamber 42 is connected to the heat storing means 20 through a conduit 44 and comprises as well a conduit 45 leading to the gas storing means and an inlet 46 for transporting air to the combustion chamber.

The apparatus operates in the following way:

A first heating sequence is when air is transported through the first auxiliary heat storage means 23, which stores heat from a previous heating sequence, to the first combustion chamber 25. After the combustion of the gaseous medium the produced flue gas is transported through the heat storage means 20, thus heating the heat storage means 20, and is passed through the second auxiliary heat storage means 24, thereby heating the second auxiliary heat storage means 24. The first heating sequence is followed by a first gas production sequence.

In the first gas production sequence gaseous medium that already is present in the system is heated in the heat storing means 20, thereafter transported to the first biomass reactor 21 containing biomass, so as to heat the biomass and produce synthesis gas, which is transported via the pump 31 to the second biomass reactor 22, thus preheating the gaseous medium in the second biomass reactor 22 and continuing to the heat storage means 20. As long as the temperature in the heat storing means 20 is high enough for production of synthesis gas, part of the produced synthesis gas will be transported to the first biomass reactor 21 through the heat storing means 20, and continue the circulation. In the beginning of the first gas production sequence the heated gaseous medium from the heat storage means 20 may have a temperature of between 1200-1400° C. when entering the first biomass reactor 21. Synthesis gas is produced from biomass with temperature above 800° C. When the temperature of the synthesis gas has dropped to about 900° C. the circulation is stopped.

When the production of synthesis gas has been stopped the second heating sequence begins. Air is transported through the second auxiliary heat storing means 24 and is heated before it enters the second combustion chamber 42 for combustion of combustible gas. From the second combustion chamber 42, flue gas is transported through the common heat storing means 20 and transported through the first auxiliary heat storing means 23, giving off heat, thereby heating the first auxiliary heat storing means 23. The second gas production sequence takes place in a similar manner as the first gas production sequence but in an opposite direction. The gas in the system is heated in the common heat storing means 20 and is transported to the second biomass reactor 22 containing biomass. Production of gas begins and the produced gas is transported via the pump 31 to the first biomass reactor 21, whereby the gaseous medium is heated, and further transported to the common heat storing means 20. The circulation may be continued as long as the temperature in the common heat storing means 20 is high enough for the production of synthesis gas. After the second gas production sequence the first heating sequence can be repeated.

The four valves 34, 35, 36, 37 and the pump 31 are used to control the direction of transport of the gaseous medium. During the first gas production cycle the first valve 34 and the second valve 37 are open and the third valve 36 and the fourth valve 35 are closed. During the second gas production sequence the third valve 36 and the fourth valve 35 are open and the first valve 34 and the second valve 37 are closed. The direction of transport can be controlled by a fixed time interval, real time measurements of e.g. gasses or temperature in the apparatus, or by other controlling factors in the process.

In a preferred embodiment the valves are controlled by a processing unit (not explicitly shown in FIG. 2), e.g. a suitably programmed microprocessor, computer or other suitable processing means.

Figure 3:
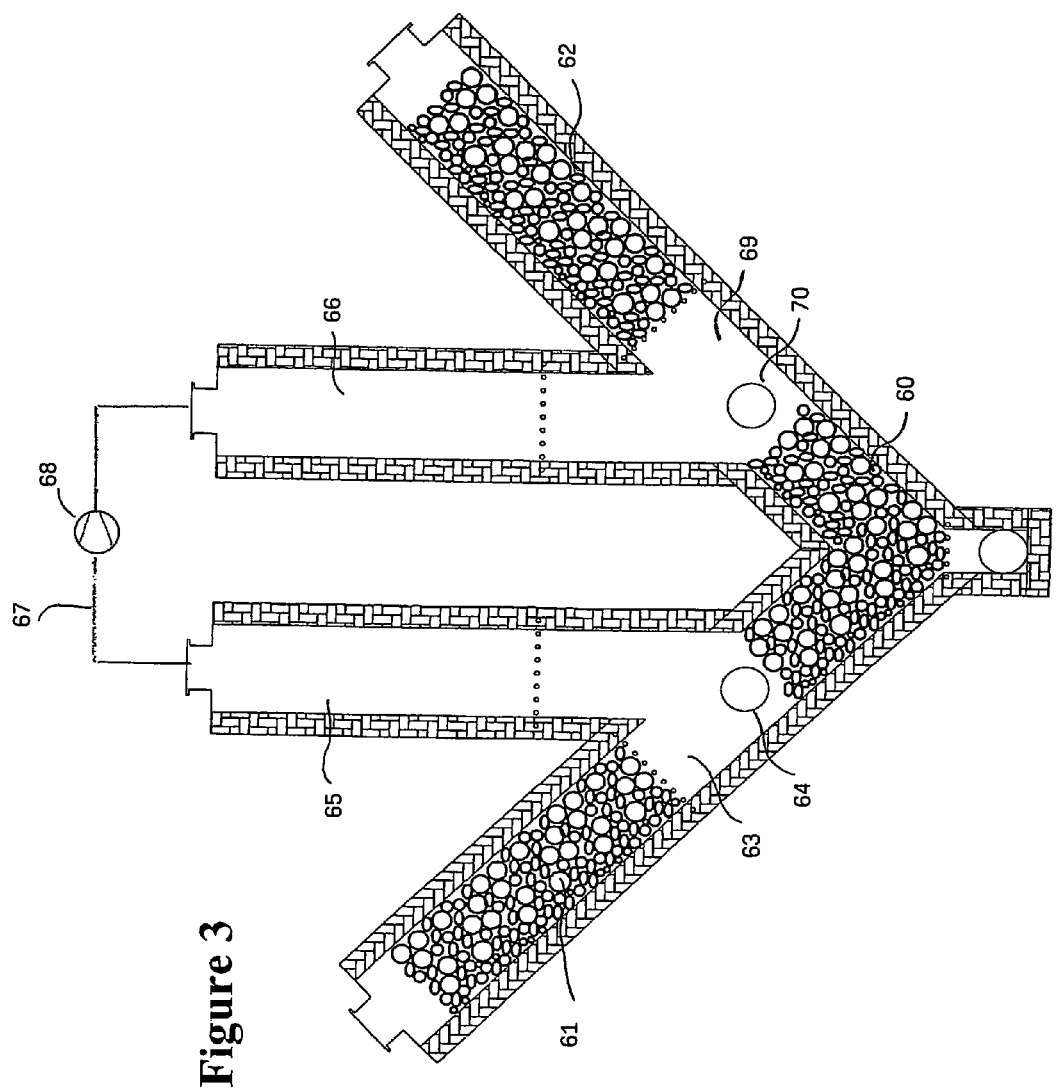
FIG. 3 shows a vertical sectional view of another preferred embodiment of the apparatus according to the invention.

FIG. 3 illustrates a V-formed apparatus with common heat storing means 60 connected to a first combustion chamber 63. The first combustion chamber 63 is connected to a first auxiliary heat storing means 61. The first combustion chamber 63 comprises a conduit 64 for transporting combustible gas to the first combustion chamber 63. The first combustion chamber 63 is furthermore connected to a first biomass reactor 65. The first biomass reactor 65 is connected to a second biomass reactor 66 through a conduit 67 via a pump 38. The second biomass reactor 66 is connected to a second combustion chamber 69, said second combustion chamber 69 having a conduit 70 for transporting combustible gas to it. The second combustion chamber 69 is furthermore connected to a second auxiliary heat storing means 62.

The apparatus operates in the following way:

In the first heating sequence air is transported through the first auxiliary heat storing means 61, is heated and thereafter transported to the first combustion chamber 63 into which combustible gas has been introduced. The mixture of combustible gas and air is combusted and the produced flue gas is transported through the common heat storing means 60, thereby heating it and is transported through the second auxiliary heat storing means 62, so as to heating it before the gas leaves the apparatus. When the common heat storage means 60 have been heated the first gas production sequence is begun, where the gaseous medium already present in the apparatus is transported through the common heat storing means 60, in which it is heated and thereafter transported to the first biomass reactor 65, containing biomass. Synthesis gas is produced and transported to the second biomass reactor 66, whereby the gaseous medium is heated and further transported into the first biomass reactor 65 through the common heat storing means 60. The circulation is continued as long as the temperature in it is high enough for the production of synthesis gas.

The second heating sequence begins when the temperature in the heat storing means 60 has dropped so no more synthesis gas can be produced. Air is transported through the second auxiliary heat storing means 62 and is heated before it enters the second combustion chamber 69, where combustible gas is being supplied to. The produced flue gas is transported through the common heat storing means 60, so as to heat it and is transported out of the apparatus through the first auxiliary heat storing means 61. The second gas production sequence is begun by heating the gas already present in the apparatus in the common heat storing means 60 and transporting it to the second biomass reactor 66, thus producing synthesis gas which is transported through to the first biomass reactor 65, and further to the common heat storing means 60 as long as the temperature in it is high enough to produce synthesis gas. Otherwise the second gas production sequence is stopped and a new heating sequence is begun.

Biomass according to the invention comprises crops, e.g. wood including wood chips, maize, wheat, canola, straw, marine biomass; by-products and residues, e.g. pea shells, rice husk; wastes, e.g. municipal waste, sewerage; surpluses, e.g. oversupplied food crops; natural vegetation, e.g. fallen branches of trees. Preferred biomasses have a particle size larger than 10 mm in order for gas to be able to efficiently pass through the biomass.

The synthesis gas produced according to the method of the invention primarily comprises hydrogen, carbon monoxide and carbon dioxide but can also contain methane, hydrocarbons from C2, oxygen and nitrogen. Preferred concentrations are; hydrogen 40-60 vol %, carbon monoxide 20-30 vol %, carbon dioxide 5-10 vol %, methane 4-8 vol %, hydrocarbons from C2 100-500 ppm, oxygen 0-1 vol % and nitrogen 5-10 vol %. More preferred concentrations are 40 vol % hydrogen ($H_2$), 25 vol % carbon monoxide, 15 vol % carbon dioxide, 4 vol % methane, 100 ppm hydrocarbons from C2, 1 vol % oxygen, 7 vol % nitrogen.

Alternatively the produced synthesis gas has the following concentrations; hydrogen 15-30 vol %, carbon monoxide 30-50 vol %, carbon dioxide 1-15 vol %, methane 0.5-5 vol %, hydrocarbons from C2 200-1200 ppm, oxygen 0.5-1.5 vol % and nitrogen 25-35 vol %. More preferred concentrations are 21 vol % hydrogen ($H_2$), 40 vol % carbon monoxide, 8 vol % carbon dioxide, 2 vol % methane, 550 ppm hydrocarbons from C2, 1 vol % oxygen, 27 vol % nitrogen.

EXAMPLE 1

An apparatus as shown in FIG. 3 is used to produce synthesis gas from spruce chips.

In the first heating sequence the heat storing means are is heated with the heat generated by the combustion of air and propane for about 40 minutes so as to obtain a temperature of 1150-1200° C. During the first gas production sequence the heated gas is transported through the biomass, for about 3 minutes producing ca. 0.8 m³/min of synthesis gas. Reheating of the heat storage with part of the produced synthesis gas to 1150-1200° C. takes about 15 minutes. The size of the circulating flow of synthesis gas in the system is about 2 m³/min.

The chemical combination of the produced synthesis gas is:

| | |
|---|---|
| Hydrogen | 40 vol % |
| Carbon monoxide | 25 vol % |
| Carbon dioxide | 15 vol % |
| Methane | 4 vol % |
| Hydrocarbons from C2 | 100 ppm. |
| Oxygen | 1 vol % |
| Nitrogen | 7 vol % |

EXAMPLE 2

An apparatus as shown in FIG. 2 is used to produce synthesis gas from spruce chips.

In the first heating sequence the heat storing means are is heated with the heat generated by the combustion of air and propane for about 40 minutes so as to obtain a temperature of 1150-1200° C. During the first gas production sequence the heated gas is transported through the biomass, for about 3 minutes producing ca. 0.8 m³/min of synthesis gas. Reheating of the heat storage with part of the produced synthesis gas to 1150-1200° C. takes about 15 minutes. The size of the circulating flow of synthesis gas in the system is about 2 m³/min.

The chemical combination of the produced synthesis gas is:

| | |
|---|---|
| Hydrogen | 21 vol % |
| Carbon monoxide | 40 vol % |
| Carbon dioxide | 8 vol % |
| Methane | 2 vol % |
| Hydrocarbons from C2 | 550 ppm. |
| Oxygen | 1 vol % |
| Nitrogen | 27 vol % |

The invention claimed is:

1. A method for the production of synthesis gas from biomass without subjecting the biomass to an initial drying operation, the method comprising the steps of:
 (a) introducing a combustible gas and air as an oxygen source and combusting the combustible gas in a combustion chamber to form hot flue gasses,
 (b) passing said flue gasses through heat storing means so as to heat said heat storing means to an elevated temperature,
 (c) retaining the flue gasses for initial use as a hot gaseous medium,
 (d) transporting the hot gaseous medium to a reactor containing biomass that has not been subjected to an initial drying operation,
 (e) heating the biomass to an elevated temperature with the hot gaseous medium to form synthesis gas,
 (f) transporting the hot gaseous medium from the reactor to an additional reactor containing additional biomass,
 (g) heating additional biomass in the additional reactor to an elevated temperature with the hot gaseous medium to form additional synthesis gas,
 (h) recycling the synthesis gas to the heat storing means to heat said synthesis gas,
 (i) withdrawing at least part of the synthesis gas formed,
 (j) recirculating the rest of the synthesis gas in form of the hot gaseous medium to the reactor, thereby continuing the production of synthesis gas through concurrent execution of steps (e)-(i), and
 (k) periodically reversing the direction of flow between the reactor and the additional reactor.

2. The method as claimed in claim 1, characterized in continuing the circulation of gaseous medium through the heat storing means and the biomass until the temperature of the gaseous medium has dropped to a level at which the production of synthesis gas has been substantially reduced.

3. The method as claimed in claim 1, further comprising:
 suspending step (i) at intervals, and
 repeating steps (a)-(d) to reheat the heat storing means.

4. The method as claimed in claim 1, characterized in using a part of the synthesis gas formed as the combustible gas.

5. The method as claimed in claim 1, wherein the air is preheated air.

6. The method as claimed in claim 1, wherein the heat storing means is heated to a temperature of 800-1600° C.

7. The method as claimed in claim 1, wherein the heat storing means include a bed of heat resistant inorganic material.

8. The method as claimed in claim 7, wherein the bed of heat resistant inorganic material includes a component capable of catalyzing cracking of high molecular weight substances formed by heat treatment of the biomass.

9. The method of claim 1, further comprising:
 processing the withdrawn synthetic gas to produce one or more chemicals.

10. The method as claimed in claim 9, wherein the one or more chemicals includes a fuel.

11. The method as claimed in claim 10, wherein the fuel is a fuel for an internal combustion engine.

12. The method as claimed in claim 10, wherein the fuel is a fuel for a fuel cell.

13. The method as claimed in claim 9, wherein the one or more chemicals includes methanol.

14. The method as claimed in claim 1, wherein the flue gasses are passed through the heat storing means in step (b) in an opposite direction from a direction of flow of the synthesis gas through the heat storing means in step (f).

15. The method as claimed in claim 1, wherein the heat storing means is heated to a temperature of 1200-1400° C.

16. The method as claimed in claim 1, wherein the heat storing means is heated to a temperature of above 800° C.

17. The method as claimed in claim 1, wherein the hot gaseous medium is transported to the reactor through the combustion chamber.

18. The method as claimed in claim 1, wherein the hot gaseous medium directly contacts to the biomass.

19. The method as claimed in claim 1, wherein the hot gaseous medium is recirculated at least four times.

20. A method for producing synthesis gas from biomass without subjecting the biomass to an initial drying operation, the method comprising:
 combusting a combustible gas and air in a combustion chamber to form hot flue gasses,
 passing the flue gasses through a heat storage device to heat the heat storage device,
 heating a gaseous medium with the heat storage device;
 circulating the gaseous medium into a reactor containing biomass that has not been subjected to an initial drying operation to heat the biomass to an elevated temperature and thereby form synthesis gas,
 transporting the hot gaseous medium from the reactor to an additional reactor containing additional biomass, heating additional biomass in the additional reactor to an elevated temperature with the hot gaseous medium to form additional synthesis gas, recirculating the gaseous medium between the heat storage device, the reactor, and the additional reactor to concurrently heat the gaseous medium, the biomass, and the additional biomass while periodically withdrawing at least part of the synthesis gas, and periodically reversing the direction of flow between the reactor and the additional reactor, thereby producing synthesis gas from biomass without subjecting the biomass to an initial drying operation.

* * * * *